C. H. WILLIAMS, Jr.
BRAKE LEVER FULCRUM.
APPLICATION FILED JULY 15, 1909.

953,163.

Patented Mar. 29, 1910.

WITNESSES

INVENTOR
C. H. WILLIAMS JR.
BY
F. R. Cornwall ATT'Y.

UNITED STATES PATENT OFFICE.

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-LEVER FULCRUM.

953,163.  Specification of Letters Patent.  Patented Mar. 29, 1910.

Application filed July 15, 1909. Serial No. 507,762.

*To all whom it may concern:*

Be it known that I, CHARLES H. WILLIAMS, Jr., a citizen of the United States, residing at Chicago, Illinois, have invented a certain new and useful Improvement in Brake-Lever Fulcrums, of which the following is a full, clear, and exact description, such as will enable others skilled in the art to which it appertains to make and use the same, reference being had to the accompanying drawings, forming part of this specification, in which—

Figure 1:
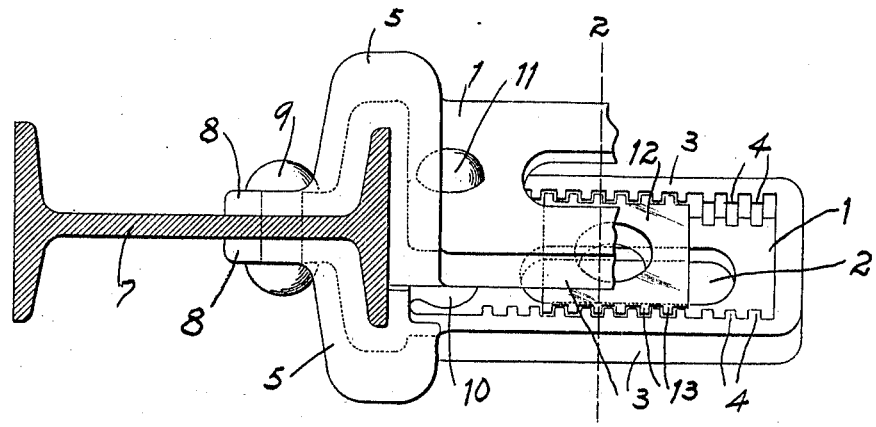
Figure 2:
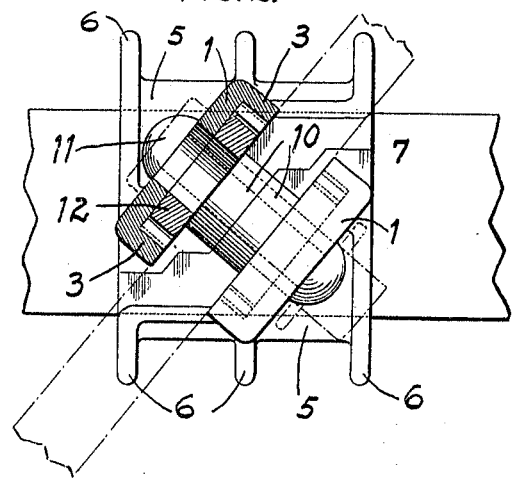
Figure 3:
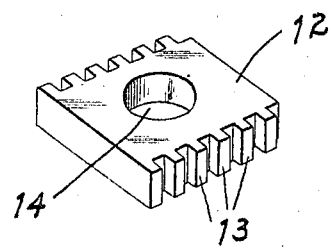

Figure 1 is a side elevation of a brake lever fulcrum of my improved construction, the same being in position on a brake beam, and a portion of said fulcrum being broken away in order to more clearly illustrate the same. Fig. 2 is a vertical section taken approximately on the line 2—2, of Fig. 1. Fig. 3 is a perspective view of one of the adjustable pivot or fulcrum pin blocks used in my improved fulcrum.

My invention relates to a brake lever fulcrum which is rigidly fixed to the central portion of a brake beam, and in which fulcrum is removably positioned a pair of adjustable blocks adapted to receive the pivot or fulcrum pin of the brake lever, which blocks have interlocking engagement with the fulcrum.

The object of my invention is to provide a simple, inexpensive fulcrum which may be readily applied to the beam, and the pivot pin blocks of which fulcrum are capable of being easily and quickly adjusted backward or forward in the fulcrum, thus changing the position of the brake lever pin hole, as is required to suit different conditions.

To the above purposes, my invention consists in certain novel features of construction and combination of parts hereinafter more fully described and claimed.

As shown in the drawings, my improved fulcrum is formed in mating parts, each comprising a plate 1, in the center of which is formed a longitudinally disposed slot 2, and integral with the side edges of said plate are flanges 3, on the inner faces of which latter are formed teeth 4.

Formed integral with the rear ends of the plates 1 are mating heads 5 which are provided with strengthening flanges 6, said heads being so formed as to embrace and fit snugly upon the flanges on one side of the I-beam 7 which forms the brake beam. Formed integral with the rear portions of the heads 5 are ears 8 which lie flat upon the web of the I-beam 7, and passing through coinciding apertures formed through said ears and through the web of the beam is a rivet 9 which rigidly fixes the fulcrum upon the beam.

Formed integral with the inner faces of the plates 1 adjacent the points where said plates join the lids 5 are lugs 10, and passing through suitable apertures formed through the rear portions of the plates and through said lugs is a rivet 11 which rigidly unites the two parts of the fulcrum.

Removably positioned against the inner face of each plate 1 and between the flanges 3 on the sides thereof is a pivot or fulcrum pin block 12, the sides of which are provided with teeth 13 adapted to engage and interlock with the teeth 4 on the flanges 3. Formed through each of these blocks is an aperture 14 which receives the pin or bolt on which the brake lever is mounted (see dotted lines Fig. 2).

The plates 1 are parallel with one another and occupy inclined positions on the heads 5, and thus the space between said plates, which is occupied by the brake lever, is inclined relative to the horizontal plane occupied by the beam. To adjust the block 12 in the fulcrum, it is necessary to withdraw the pivot of fulcrum pin and remove the brake lever, after which said blocks can be readily removed from between the flanges 3 and adjusted to the desired position. The interlocking engagement between the sides of the blocks and the plates 1 rigidly maintain said blocks in their adjusted positions, and the brake lever positioned between the blocks holds the same against the inner faces of the plates.

A fulcrum of my improved construction is comparatively simple, easily applied to brake beams, and provides means whereby the brake lever pin hole may be readily adjusted forward or backward in the fulcrum, as is required to suit different conditions.

It will be understood that minor changes in the construction and form of my improved fulcrum can be made and substituted for those herein shown and described without departing from the spirit of my invention.

I claim:

1. A two-part fulcrum for brake beams, and a pair of pivot pin blocks adjustably arranged on said fulcrum.

2. A two-part fulcrum for brake beams, and a pair of pivot pin blocks adjustably arranged on said fulcrum and having an interlocking engagement therewith.

3. A two-part brake lever fulcrum, and a pair of pivot pin blocks adjustably arranged on the fulcrum.

4. A two-part brake lever fulcrum provided with channel-shaped plates, and pivot pin blocks adjustably seated in said plates.

5. A two-part brake lever fulcrum provided with channel-shaped plates, and pivot pin blocks adjustably seated in said plates and having interlocking engagement therewith.

6. A brake lever fulcrum composed of mating parts, and pivot pin blocks adjustably arranged on said parts.

7. A brake lever fulcrum composed of mating parts, and pivot pin blocks adjustably arranged on said parts and having interlocking engagement therewith.

8. A brake lever fulcrum composed of mating parts, pivot pin blocks adjustably arranged on said parts, and means whereby said mating parts are rigidly fixed to one another.

9. A brake lever fulcrum composed of mating parts, pivot pin blocks adjustably arranged on said parts, and means whereby said mating parts are rigidly fixed upon a brake beam.

10. A brake lever fulcrum composed of mating parts, pivot pin blocks adjustably arranged on said parts, and means whereby said mating parts are rigidly fixed to one another and to a brake beam.

11. A brake lever fulcrum composed of two parts, each part having a channel-shaped member, which members lie parallel with one another, and pivot pin blocks adjustably arranged in said members.

12. A brake lever fulcrum composed of two parts, each part having a channel-shaped member, which members lie parallel with one another, and pivot pin blocks adjustably arranged in said members and having interlocking engagement therewith.

13. A two-part fulcrum for brake beams, a pair of pivot pin blocks adjustably arranged on said fulcrum, and the two parts of which fulcrum are rigidly fixed to one another.

14. The combination with a brake beam, of a fulcrum formed in mating parts rigidly fixed to the beam, and a pair of pivot pin blocks adjustably arranged in the fulcrum.

15. The combination with a brake beam, of a fulcrum formed in mating parts rigidly fixed to the beam, and a pair of pivot pin blocks adjustably arranged in the fulcrum and having interlocking engagement therewith.

16. The combination with a brake beam, of a two-part fulcrum having parallel channel-shaped extensions, and pivot pin blocks adjustably arranged in said extensions.

17. The combination with a brake beam, of a two-part fulcrum having parallel channel-shaped extensions, and pivot pin blocks adjustably arranged in said extensions and having interlocking engagement therewith.

In testimony whereof I hereunto affix my signature in the presence of two witnesses, this 2nd day of July, 1909.

CHARLES H. WILLIAMS, Jr.

Witnesses:
    EDWARD T. WALKER,
    JOSEPH W. WEINLAND.